US010400950B1

(12) United States Patent
Hauser

(10) Patent No.: US 10,400,950 B1
(45) Date of Patent: Sep. 3, 2019

(54) ANIMAL HEAD MOUNTING OR DISPLAY SYSTEM

(71) Applicant: Aaron L. Hauser, Greene, IA (US)

(72) Inventor: Aaron L. Hauser, Greene, IA (US)

( * ) Notice: Subject to any disclaimer, the term of this patent is extended or adjusted under 35 U.S.C. 154(b) by 652 days.

(21) Appl. No.: 14/051,550

(22) Filed: Oct. 11, 2013

Related U.S. Application Data

(60) Provisional application No. 61/712,936, filed on Oct. 12, 2012.

(51) Int. Cl.
*F16M 11/04* (2006.01)
*F16M 13/02* (2006.01)

(52) U.S. Cl.
CPC .......... *F16M 13/022* (2013.01); *F16M 11/04* (2013.01); *F16M 13/02* (2013.01)

(58) Field of Classification Search
CPC .... F16M 11/04; F16M 11/2021; F16M 13/02; F16M 13/022; B44C 5/00; B44C 5/02; A47B 81/00
USPC .......................................................... 434/296
See application file for complete search history.

(56) References Cited

U.S. PATENT DOCUMENTS 231,688 A * 8/1880 Spencer ................. F16M 13/02 248/126
4,464,440 A 8/1984 Dotzman
4,717,626 A 1/1988 Badger
4,971,865 A 11/1990 Nowlan
5,015,532 A 5/1991 Knight
D355,390 S 2/1995 Culbertson
5,472,765 A 12/1995 Green
6,828,035 B1 12/2004 Goettl
7,243,888 B2 7/2007 Peek
D608,686 S 1/2010 St. Ama
8,201,793 B1 6/2012 Powell et al.
2009/0230260 A1 9/2009 Damin
2011/0031363 A1* 2/2011 Shaw ........................ B44C 5/02 248/220.22
2011/0036959 A1* 2/2011 Raby ...................... G09B 23/36 248/282.1

OTHER PUBLICATIONS

"Skull Hooker Little Hooker European Mount Display Steel Graphite Black," http://www.midwayusa.com/product/920684/skull-hooker-little-hooker-european-mount-display-steel-graphite-black.*
"The Kenai," Alaska Antler Works, http://web.archive.org/web/20080510150259/http://www.alaskaantlerworks.com/The_Kenai.htm, May 10, 2008.*

* cited by examiner

*Primary Examiner* — Sam Yao
*Assistant Examiner* — Jennifer L Korb
(74) *Attorney, Agent, or Firm* — McKee, Voorhees & Sease, PLC

(57) ABSTRACT

A system for mounting items or displaying items on either wall or tabletop includes a mounting interface that can be an actual or simulated animal part. Optionally a bracket allows adjustability of orientation of the animal head relative to the mounting interface.

22 Claims, 12 Drawing Sheets

ANIMAL HEAD MOUNTING OR DISPLAY SYSTEM

CROSS-REFERENCE TO RELATED APPLICATIONS

This application claims priority under 35 U.S.C. § 119 and/or § 120 to provisional application Ser. No. 61/712,936 filed Oct. 12, 2012, herein incorporated by reference in its entirety.

BACKGROUND OF THE INVENTION

Field of the Invention

The present invention relates to the mounting or display of hunting trophies, such as, for example, animal heads.

Related Art

A conventional way to mount hunting trophies is to take a wood plate, and somehow secure the hunting trophy to the plate. The wood plate is then mounted on the wall by any number of conventional ways (e.g., picture-hanging type bracket or direct nailing or screwing to the wall). Such a system is non-complex and relatively economical. The wood plate can be cut or machined to have different perimeter shapes or surface ornamentation. But the basic design appearance is the same—the animal trophy on a basically flat plate mounted on a wall. Additionally, there is little ability to change or manipulate the trophy relative to the plate after the system is assembled.

There have been a number of different approaches to mounting animal trophies. Examples are as follows:

U.S. Pat. No. 8,201,793 (Powell et al) shows a mounting plate to which an animal head and antlers can be attached. It also shows other items can be attached to that mounting plate. Some examples are a wood log, a rock, or foliage (simulated or actual).

Des. 355,390 (Culbertson) is a design patent showing a mounting plate that is ornamented to look like a greatly enlarged stone arrowhead.

U.S. Pat. No. 6,828,035 (Goettl) describes a full head and shoulder mounting system, including a horizontal log 14 extending from a vertical wood plate 12 that could be wall mounted.

US 2011/0031363 (Shaw), incorporated by reference herein, describes what it calls a European mount for a skull and horn or antler of game animals includes a wall mounting plate but also specifically shaped extensions that can fit into the anatomical structure of the animal skull.

U.S. Pat. No. 7,243,888 (Peek), incorporated by reference herein, discloses a plate that can either be wall mounted or a base on a horizontal surface such as a tabletop with a specially configured elongated bar 39 that can fit into anatomical structure of the skull of an animal.

US 2009/0230260 (Damin) discloses a skull and antler mount including a plate for tabletop or vertical wall. The table mount includes a stand portion.

U.S. Pat. No. 5,015,532 (Knight) discloses the concept of a molded plastic taxidermy mannequin that receives animal head skin and antlers and uses a plate and post for wall mounting.

U.S. Pat. No. 4,464,440 (Dotzman) discloses a wall plate or tabletop base stand plate with a simulated animal skull to which actual trophy horns or antlers can be attached for display.

U.S. Pat. No. 4,971,865 (Nowlan) discloses a bracket having one plate which can be wall mounted and other components which allow antlers to be displayed and the distance from the wall adjusted.

U.S. D608,686 (St. Ama) discloses an ornamental design of a simulated animal skull to which actual horns could be attached for wall mounting.

U.S. Pat. No. 4,717,626 (Badger) discloses a wall mounting plaque or plate having what it calls a "bone bridge", an artificial component to which actual antlers or horns can be attached and then that combination attached to the mounting plate.

U.S. Pat. No. 5,472,765 (Green) another example of a wall mounting plate having an interface to which actual antlers or horns could be attached, and then that interface and actual horns can be attached to the wall mounting plate.

Despite all these different approaches, the inventor has identified problems or deficiencies in the art.

There is, therefore, room for improvement in the art.

SUMMARY OF THE INVENTION

It is therefore a principle object, feature, aspect or advantage of the present invention to provide a system for mounting hunting or animal-type trophy, or other items to be mounted or displayed, which improves over or solves problems and deficiencies in the art.

Other objects, features, aspects or advantages of the present invention include a mounting or display system which:

A. Is relatively economical.

B. Is flexible in how the item mounted or displayed is oriented, and where the system is mounted.

C. Has a distinctive and aesthetic look.

D. Can take many shapes or forms.

In one aspect of the invention a mounting or display system includes an interface between the item to be mounted and displayed in either a wall or a tabletop. In one example, the interface can be an actual or simulated animal part. One example is an actual or simulated shed horn or antler. Thus, if the item to be mounted or displayed is an animal head (which can include antlers or horns), the mounting system comprises the animal head and the interface.

In another aspect of the invention, a bracket can be utilized between the mounting interface such as described above and the animal head. The bracket can include one or more of: (1) adjustability of angle between head and mounting interface; (2) an expandable member that can be adjusted to interference fit into an anatomical feature of an animal head so that it can be used for a variety of sizes of animal heads; and (3) secondary mounting members that can be inserted in the animal head to make a secure mount.

In another aspect of the invention, the mounting interface as above described can be either an actual animal part or a simulated part. In one example, the mounting interface is a shed horn or antler of an animal. In particular, the shape of that shed horn or antler includes a proximal end and a distal end with a main body between, a plurality of points off of the main body cooperate to basically provide multiple supporting legs such that the distal and proximal ends, along with the ends of the points, provide a stable set of legs to interface with a wall or a tabletop. The item to be mounted or displayed is then mounted along the main body of the shed horn or antler such that it would be stable and balanced relative to a wall or tabletop. For example, three locations on the actual or simulated part function as a tripod to place the assembly on a table top or horizontal surface in a stable manner.

In another aspect of the invention, the ornamental design of mounting an animal head to a wall or displaying it on a horizontal surface includes the animal head and an actual or simulated part of an animal.

These and other objects, features, aspects or advantages of the present invention will become more apparent with the accompanying specification.

BRIEF DESCRIPTION OF THE DRAWINGS

Appended to this description are illustrations or pictures which are summarized as follows.

DETAILED DESCRIPTION OF EXEMPLARY EMBODIMENTS

Overview

Figure 1:
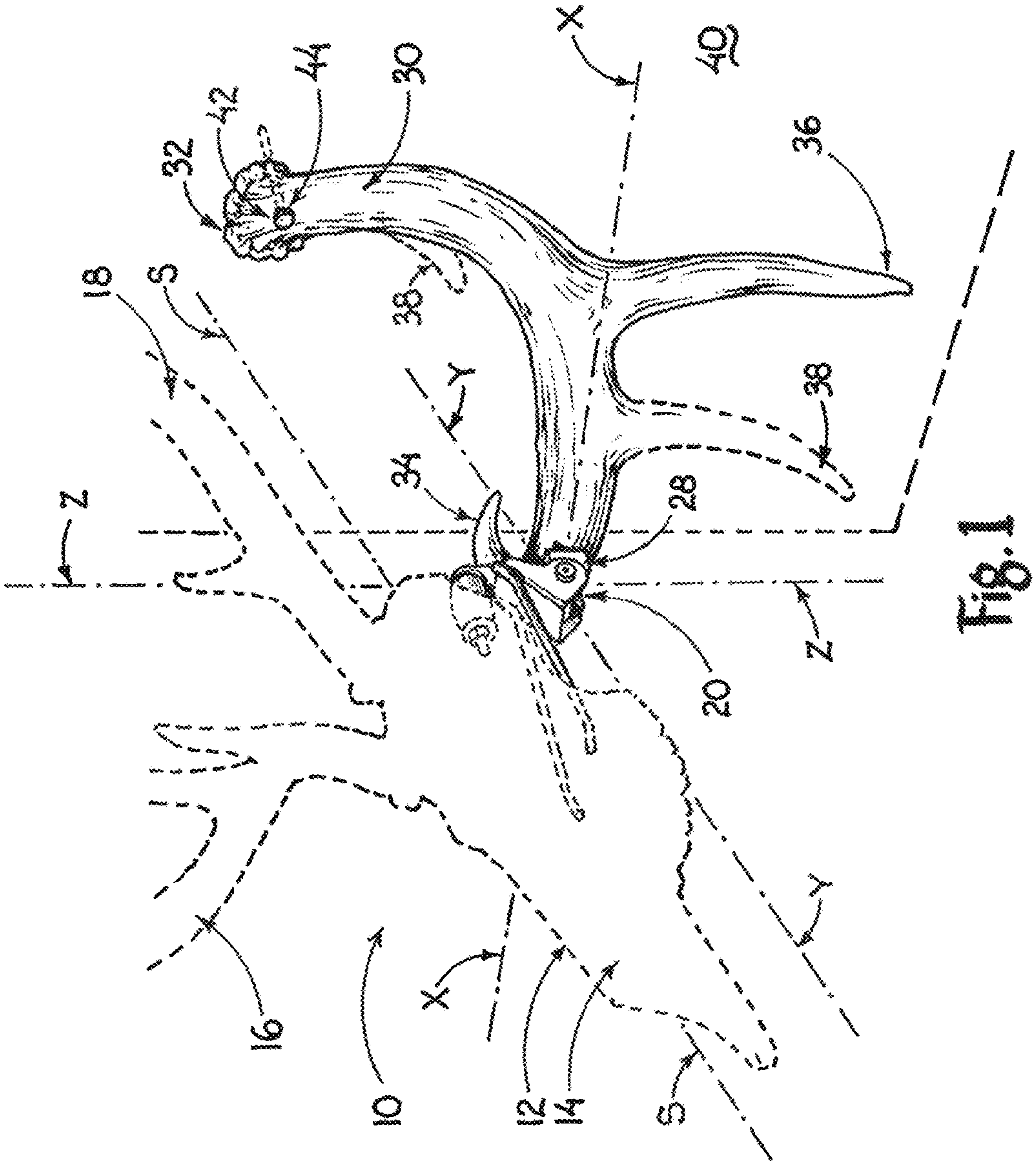
FIG. 1 is a perspective view of a system according to one exemplary embodiment of the present invention mounted on a vertical wall or surface with an animal skull extending outward from the wall in a roughly horizontal displayed position.

For a better understanding of the invention, several embodiments will now be described in detail. Frequent reference will be taken to the drawings. Reference numbers and letters will be used to indicate certain parts and locations in the drawings. The same reference numerals or letters will be used throughout the drawings to indicate the same parts locations unless otherwise indicated.

In these exemplary embodiments, the item to be mounted or displayed is an animal skull with intact horns or antlers. The mounting interface to wall or table can be an actual shed horn or antler of the same type of animal—here North American Deer or a simulated shed horn (e.g. of ceramic, plastic, or other material).

It is to be understood, however, that the mounting system of these embodiments could be used to mount or display other items. This could include other animal heads with or without horns or antlers, or other items. Additionally, it is to be understood that the mounting interface does not necessarily have to be the actual or simulated shed horn of the same animal or even a shed horn. It could be another actual or simulated animal part or decorative part, such as driftwood, tree branch, or other non-planar member.

Exemplary Embodiment One

By referring to FIGS. 1 and 2A-G in one form, a mounting or display system 10 includes an item to be mounted, here animal head 12 with skull 14, and right and left antlers 16 and 18, and a mounting interface 30, here an actual shed horn of the same type of animal as skull 14.

Shed horn 30 is called a mounting interface because it provides the base or component between the animal head 12 and the mounting surface, in the case of FIG. 1, vertical wall 40. In this embodiment, mounting bracket 20 holds skull 14 to mounting interface 30 and is adjustable to allow different tilt angles for skull 14.

As can be seen in the Figures, the ornamental appearance of that combination is unique and much different than just a wood wall plaque as the mounting interface for the animal trophy.

FIGS. 2A-G show that the same combination of animal head 12 and shed horn mounting interface 30 can be alternatively used to simply display animal head 12 on a horizontal surface such as tabletop 48. The same bracket 20 and mounting interface 30 allows wall mounting or table mounting. As can be appreciated from these drawings or pictures, shed horn mounting interface 30 has a main body with a proximal end 32 and a distal end 34. What would be called main point 36 is an off-shoot or other point off the main body and configured to cooperate with proximal and distal ends 32 and 34 to provide essentially a tripod. One or more additional points off main body (see reference numerals 38) may or may not be included on interface 30 to present multiple antler points. By empirical testing, the basic stability of such a shed horn 30 can be established and then a mounting position along the main body 36 of shed horn 30 can be selected for bracket 20 to mount the trophy head 12 such that hung from a vertical wall 40, as in FIG. 1, mounting interface shed horn 30 provides a stable wall mount to support trophy head 12; and likewise, at least three locations on interface 30 act as a tripod or stable supporting legs to provide a self-supporting stable table stand (see FIGS. 2A-G). The isometric views of right elevation (FIG. 2B), front elevation (FIG. 2C), left elevation (FIG. 2D), top plan (FIG. 2E), rear elevation (FIG. 2F), and bottom plan (FIG. 2G), show additional details of assembly 10.

It is to be understood that not every shed horn would have intrinsically the characteristics needed for such stability. Thus, there may need to be some selection of appropriate shed horn that meets the needs for wall or table mounting. Alternatively, by some machining or alteration of an actual shed horn, there is the possibility of making it work in this manner. For example, an actual shed horn might be modified (e.g. one or more points shortened or removed) to create a stable tripod or possibly more than three-legged support (e.g., four, five, or more).

A still further alternative is as follows. A simulated shed horn having the necessary stability features as described above could be created from ceramics or perhaps even plastics. In such a manner, an unlimited number of simulated shed horns having the necessary stability features for mounting or display could be kept in inventory and there would not need to be a search for, testing, and other work to create the necessary stability and find the best mounting position on the shed horn.

Making of such a simulated shed horn to have the appearance of an actual shed horn can be accomplished in a number of ways. One widely analogous manufacturing method is the manufacture of artificial driftwood or artificial logs for natural gas fireplaces and the like. Additionally, plastic manufacturing methods are advanced and can simulate the look, texture, and shape of any number of things, including shed horns.

As can therefore be seen by FIGS. 1 and 2A-G, instead of a mounting board or plate, mounting interface 30 allows either hanging along a more vertical surface (FIG. 1) or a more horizontal surface (FIG. 2B) and then supporting for display some type of animal trophy such as skull 14. The aesthetics are much different than hanging by a board or plate because mounting interface 30 is either an actual or simulated object instead of simply a mounting board. In this embodiment it is an actual or simulated shed horn of the same or similar type to the animal trophy being displayed.

In both vertical and horizontal display orientations, by appropriate selection of the configuration of the interface 30, or by design and manufacturing of the appropriate configuration for a simulated such interface 30, the shape and configuration of interface 30 can actually serve to stabilize combination 10 relative to vertical, horizontal, or even oblique surfaces. As mentioned, in one example the proximal end 32 and distal end 34 of the simulated or actual shed horn interface 30 provide two points of contact with a generally planar surface such as a wall or table top. A third contact point (here intermediate antler point 36) provides essentially the third leg of a tripod. Thus, those three points would exist in generally the same plane such as they would be functioned essentially like a tripod. This would mean no other structures (other points or parts) from interface 30 would extend through that plane. Of course, it does not necessarily have to be the proximal or distal ends that contribute to the tripod. Just one of those points plus two other intermediate antler points might work (or three intermediate points). Again, to accomplish this tripod function with an actual shed horn would require a shed horn having that configuration or being able to be modified to have that configuration. On the other hand, if the shed horn is an artificial simulation, the designer could make sure the design meets that configuration.

It is to be understood that if simulated, the interface 30 could be somewhat abstract in the sense that it does not necessarily have to be ornamented, colored, textured, or otherwise created to be a close identical simulation to actual shed horns or other objects that might be used. It could be very abstract in appearance. But, as with the analogy to simulated wood logs for gas fireplaces, it could be very closely identically simulated in all respects.

Therefore, a subtle but beneficial aspect of this embodiment is that the same assembly could be used for mounting the animal trophy on any of a number of surfaces of different orientations relative to horizontal. The specific shape, the number of antler points or other projections, the size and configuration can vary according to need or desire. It can be scaled up or down. The designer would have to factor in the size and configuration of whatever is to be mounted to interface 30 and displayed. For example, larger size and dimensions for interface 30 are probably indicated for larger animal trophies. However, FIGS. 1 and 2A-G are intended to convey that a single size interface 30 could likely support a substantial range of sizes of animal skulls.

FIGS. 1 and 2A-G indicate in this embodiment that one method of hanging interface 30 on a vertical surface is screw 42 through a through-hole 44 drilled or made through shed horn 30 at or near its proximal end 32 (proximal meaning the end of the shed horn closest to its connection point to an animal). Such a screw would be selected to screw into the vertical wall or structural members behind it sufficiently to support the mass of the whole combination 10; interface 30 and the animal trophy 12. This is a quite simple way of mounting it vertically. Other ways, of course, are possible. Examples would include hooks, clamps, bands, and even perhaps adhesives or combinations of the same.

FIG. 1 shows bracket 20 is mounted along interface 30 and has some sort of structure that allows the animal trophy to be mounted to it. It is to be understood that this bracket could take on many forms and configurations. Furthermore, bracket 20 may not even be needed. Skull 14 might be connected directly to interface 30 (e.g., bolt, adhesive, or otherwise). One specific form will be described later. But as can be appreciated, the configuration of bracket 20 will be somewhat driven by the type of animal trophy or other thing to be displayed. In this example, in FIG. 1 and FIGS. 2A-G, the thing to be displayed is the skull of the animal species comprising a deer. Bracket 20 has at least one extending element that is designed to correlate with some cavity in a deer skull to help support it. As will be described additionally, either the bracket allows different mounting orientations of skull 14 relative to interface 30 or the bracket itself can be adjusted such that the same bracket 20 mounted in the same manner to the interface 30 (in this first example simply by a bolt 70 through a drilled or otherwise created throughbore 46 along the interface main body, see FIG. 3B) can be pivoted over a range of motion such that skull 14 can be directed outwardly or somewhat towards horizontally from the vertical wall 40 (FIG. 1) or pivoted to also be generally towards horizontal relative to a horizontal surface such as table top 48 in FIG. 2A. A bolt 82 (FIG. 3B) or other adjustment mechanism would allow bracket 20 to have such pivoting action and then be locked into a position depending on its orientation But it is to be understood that such a pivoting bracket 20 could allow skull 14 to be oblique to either the vertical surface 40 or horizontal surface 48 for different display options.

Therefore, the embodiment one of FIGS. 1 and 2A-G illustrate a system or assembly of a mounting interface 30 for mounting an object such as an animal trophy skull 14 to it and then having that interface 30 being either mountable to surface by some attaching structure or technique or being placed in a substantially stable manner on surfaces such as horizontal surfaces.

Second Exemplary Embodiment

In another aspect of the invention, the ornamental appearance of the combination of a trophy animal head and a shed horn, such as in FIGS. 1 and 2A-G, is possible. The unique look of mounting an animal head to a shed horn and then hanging that combination or displaying it on a tabletop, represents a much different ornamental appearance than mounting the animal head to wood or metal plate. As shown in these figures, including the perspectives of FIGS. 1 and 2A and then the isometrics of FIGS. 2B-G, mounting interface 30 that is an actual or simulated object not intended originally for mounting to surfaces, provides a unique actual appearance. This is without regard to the specific type of mounting bracket 20 or necessarily an actual or simulated shed horn. Interface 30 could be other objects not originally purposed as mounting boards or plaques.

Third Exemplary Embodiment

Another aspect of the invention is a specific bracket that can be used to mount an item to be displayed to a mounting interface of the type or analogous to that of mounting interface 30. It is to be understood that this mounting bracket 20 in this embodiment is adjustable to allow the thing to be displayed to be oriented in different relationships relative to mounting interface 30 depending on choice or on what surface or structure the mounting interface 30 is placed. For this embodiment, the thing to be mounted and displayed is the animal head 12 and the mounting interface is shed horn 30. Again, however, either can take different configurations consistent with this description. FIGS. 3A-B, 4, and 5A-B show details of such a bracket 20.

Figure 2A:
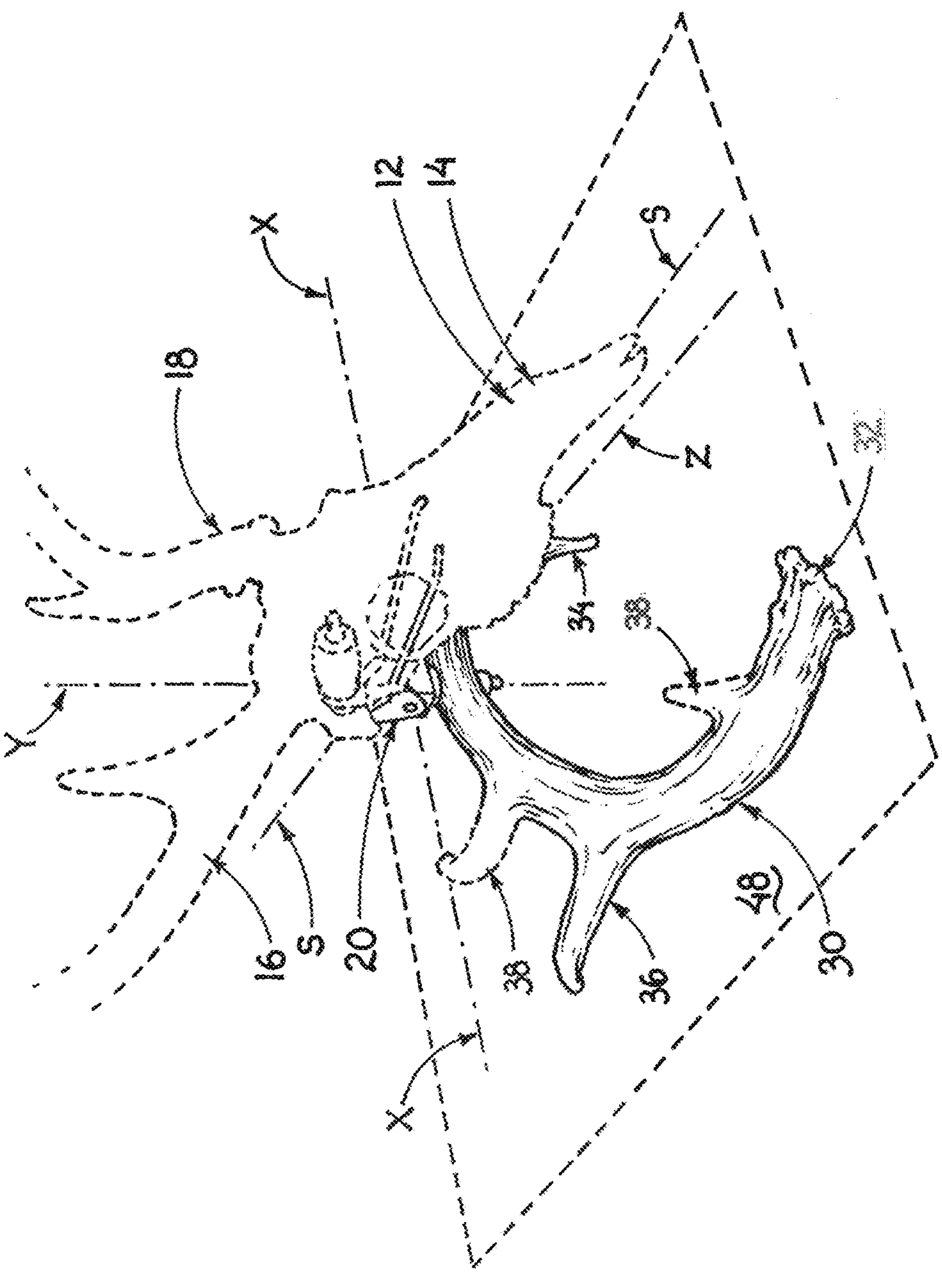
FIG. 2A is a perspective view of the system of FIG. 1 but placed on a horizontal surface—here a tabletop, and adjusted for the animal skull to be in a generally horizontal displayed position.
Figure 2B:
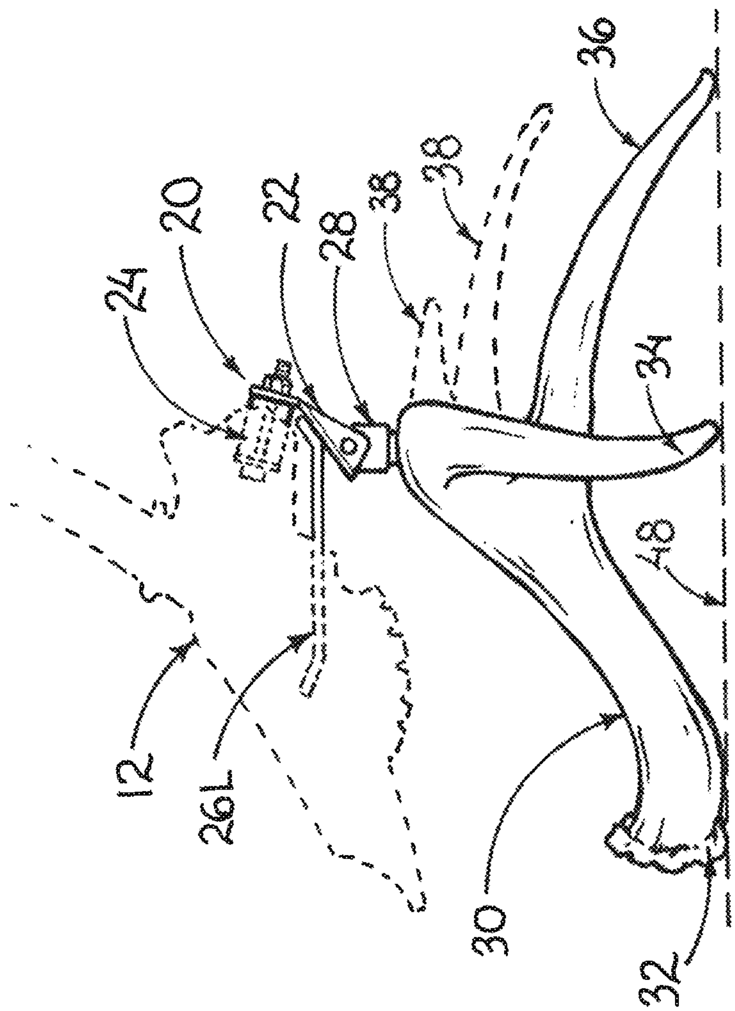
FIGS. 2B-G are isometric views of the system of FIG. 2A.
Figure 2C:
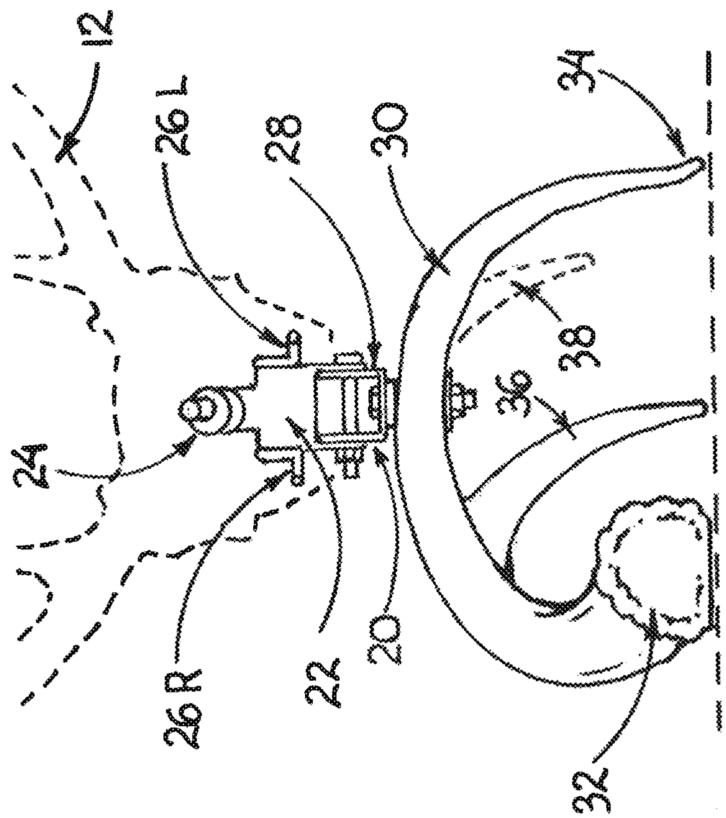
Figure 2D:
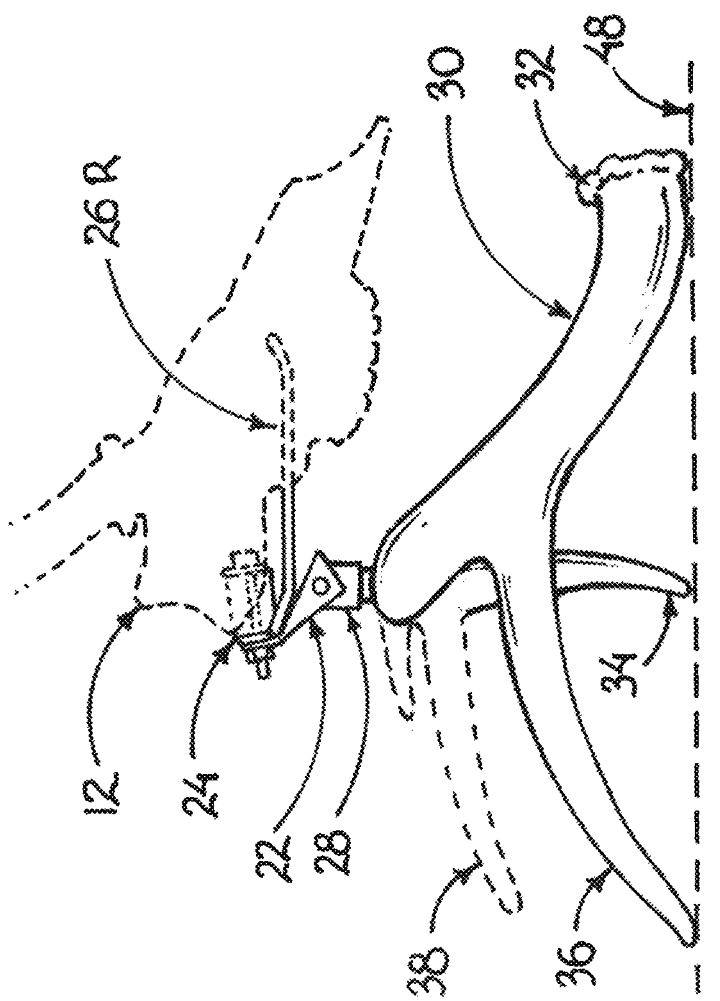
Figure 2E:
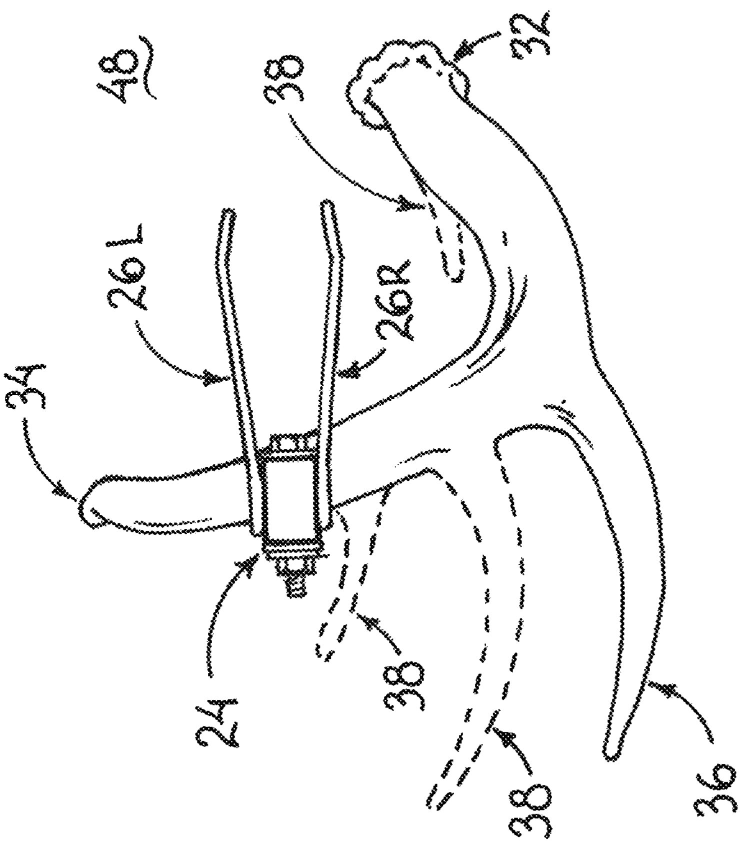
Figure 2F:
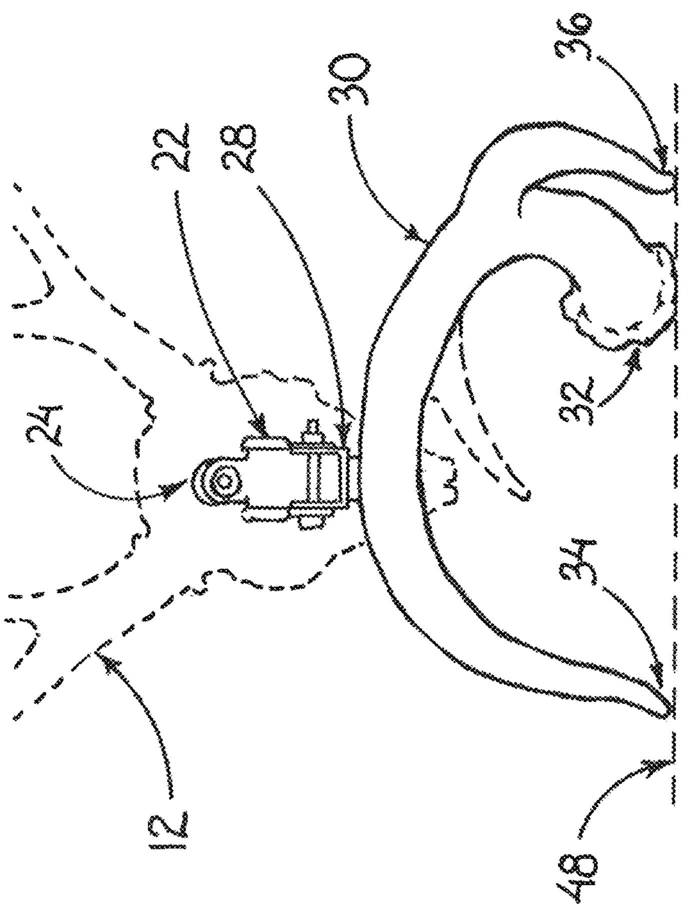
Figure 2G:
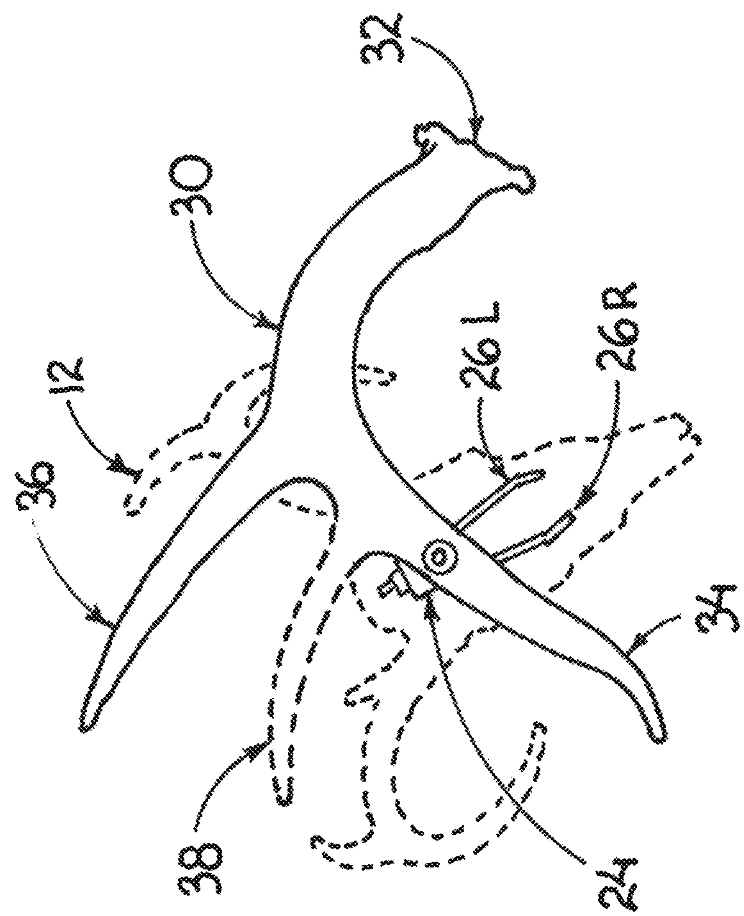
Figure 3A:
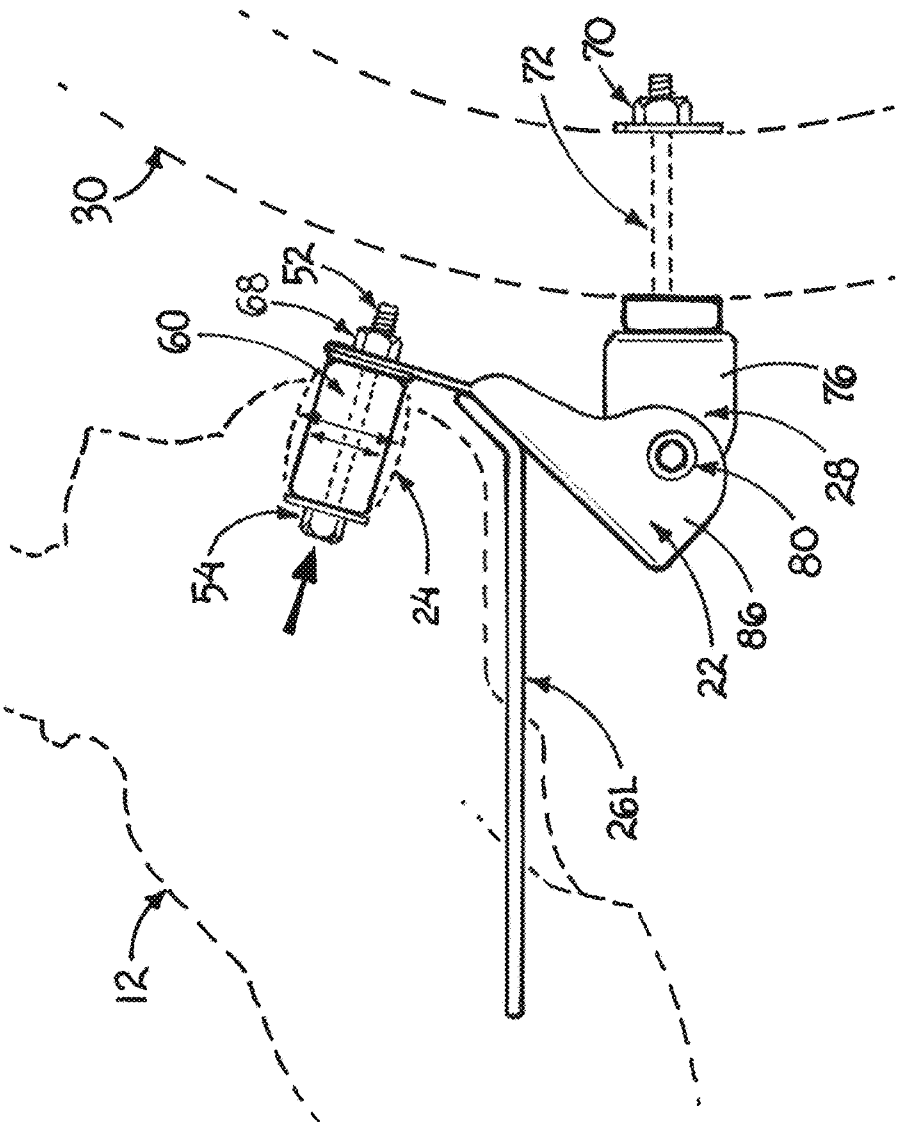
FIG. 3A is a side assembled view of a bracket 20 used with the system of FIGS. 1 and 2A-G, to attach the item to be mounted or displayed to the interface or part between the wall or table and the item could be mounted or displayed.

By reference also to FIGS. 1 and 2A-G (which show bracket 20 as one option for mounting animal head 12 to shed horn 30 and FIGS. 3A and B), bracket 20 includes a main pivot body portion 22 of metal. On the top side of pivot body 22 are two rods or prongs 26L and R that extend (left and right 26L and 26R) outward to free distal ends. Also on top is what will be called expandable member 24.

The bottom side of body 22 has two ears 86 (see FIG. 3B) that are basically parallel and spaced apart on opposite lateral sides of body 22. A base 28 is mounted between those ears 86. A threaded bolt 72 extends downwardly through base 28 and through the through-bore 46 in shed horn interface 30, and secures base 28 to shed horn 30 by nut 70 and washers 78. That threaded bolt 72 allows mounting of entire bracket 20 to shed horn 30.

By referring to FIG. 3A and FIG. 3D, when assembled, bolt 72 and nut 70 hold base 28 of bracket 20 to shed horn 30. Pivot body 22 is pivotable around the axis of bolt 80 that is secured through aligned openings 77 and 87 in sets of ears 76 and 86 of bracket base 28 and pivot body 22 respectively. This allows pivot body 22 to pivot over a range of motion in one plane orthogonal to bolt 80. This essentially could be on the order of at least 180° if not more depending on shape of shed horn 30 and the shape of pivot body 22 and any structure associated or mounted to it.

Outwardly extending rods 26R and 26L can be made integral from pivot body 22 or could be attached by other techniques. A flange that includes a through-hole or aperture 67 can optionally receive what is called expendable member 24 generally. This expandable member includes an expandable elastomeric cylinder 60 that extends spaced apart and generally in a similar direction as rods or prongs 26R and 26L from pivot body 22.

As indicated in FIG. 3A, a skull 14 can be mounted to bracket 20 as follows.

The longitudinal axis of elastomeric cylinder 60 (basically along the longitudinal axis of bolt 52) as well as the diameter of elastomeric cylinder 60 is configured to fit within a range of spinal openings to skull 14 for that species of animal. As diagrammatically illustrated in FIG. 3A, by turning bolt 72 once cylinder 60 is in that spinal opening the distance between the head of bolt 52 and nut 68 would decrease, (see arrow pointing at the head 54 of bolt 50 in FIG. 3A), thus the perimeter diameter of elastomeric cylinder 60 would swell or increase (compare the shorter double ended arrow indicating width of cylinder 60 in a normal uncompressed state with the longer double ended arrow across cylinder 60 in FIG. 3A, indicating it swelled and compressed). Essentially this swelling or expanding creates an interference fit of cylinder 60 relative that skull opening. To have access to turning bolt 52 once cylinder 60 is in skull 14, the threaded end of bolt 52 could have a hex-type countersunk socket 58 to allow a hex key or hex bit to turn bolt 52 relative to nut 68, which can be welded or otherwise immobilized and secured around through-hole 67 on pivot body 22 (se FIG. 3B). The amount of swelling or enlargement of cylinder 60 possible would be a function of the material properties of cylinder 60 and the amount of travel of bolt 52 relative to fixed-in-place nut 68. This is one way to help secure animal skull 14 to bracket 20 in a removable and adjustable fashion including for different size skulls 20 and skulls having some range of differences in the opening in which cylinder 60 can function.

FIG. 3A also shows how prongs 26L and 26R could be configured to further help support skull 14 on bracket 20. By selection of length and bend of rods 26L and 26R in a correlated manner to known general positions of other openings in skull 14 (here generally configured to work for at least one set of sinus openings 15L and 15R on opposite lateral sides of skull 14 for that species of animal), when cylinder 60 is slid into spinal opening, prongs or rods 26R and 26L would at least generally align with one set of those sinus openings 15R and 15L and help hold up skull 14 as it extends substantially from bracket 20. As can be appreciated, rods 26R and L can be of different shapes and configurations according to the type of thing being suspended. Rods 26 L and R could be rigid (e.g., made of metal) or other material that has some rigidity but a degree of flexure or even some bendability to matchup with the range of such sinus openings 15L and R. Such prongs 26 could be optional or omitted.

Figure 4:
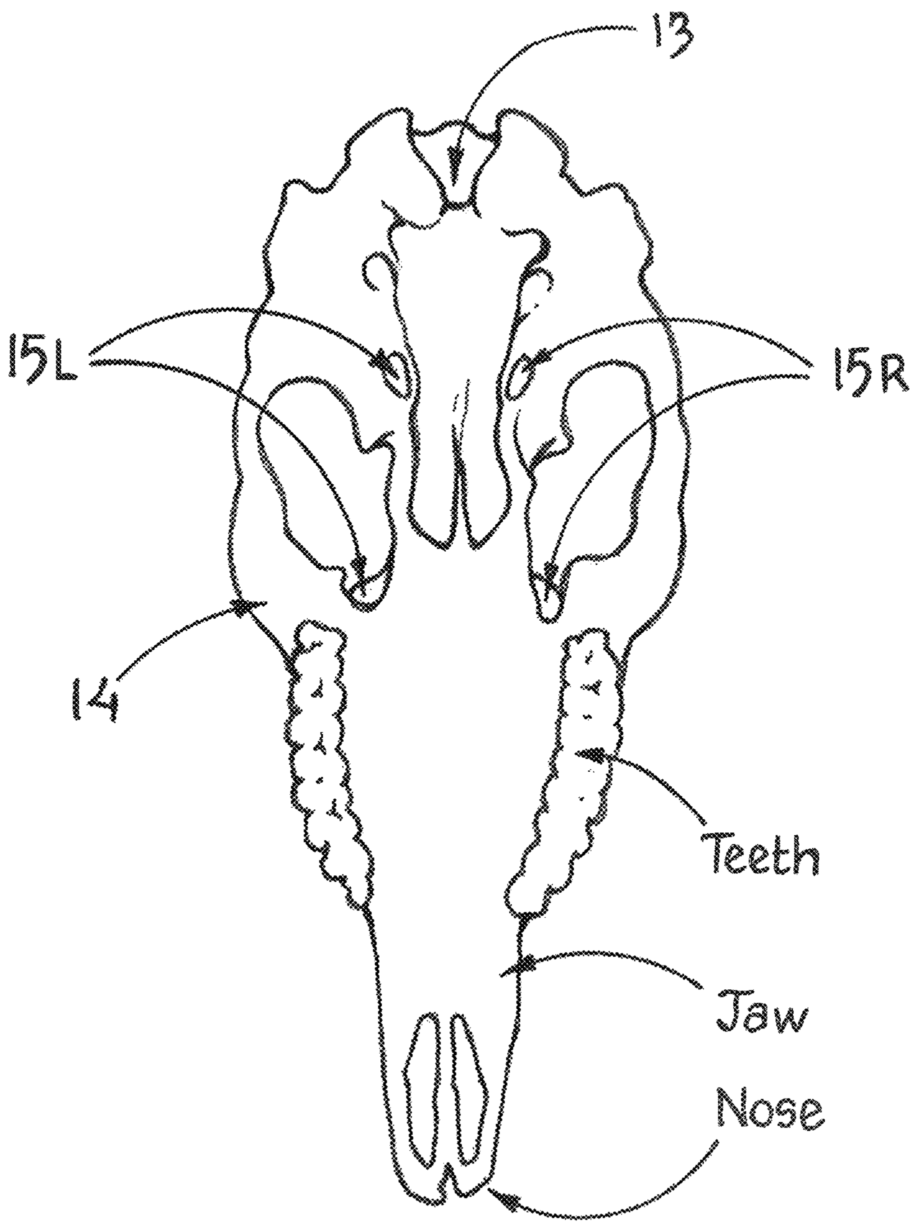
FIG. 4 is a bottom plan view of the animal skull of preceding figures showing certain anatomical openings which are conventional for this type of animal.

More specifically, FIG. 4 shows a bottom plan view of an animal skull 14. For North American Deer, a spinal opening 13 is basically centered in the back of the head. On opposite sides of spinal opening 13 are at least one set of sinus openings 15L and R (here two sets are shown).

As can be appreciated by viewing the drawings, rods 26L and R are spaced for conventional distance between a set of sinus openings 15L and 15R. Expandable member 24 is spaced to correspond to spinal opening 13.

Metal rods 26L and R could have some adjustability by bending to fit different spacings between sinus openings 15L and R over some range. It is to be understood, however, that for most mature North American Deer, that spacing is relatively consistent.

Figure 5B:
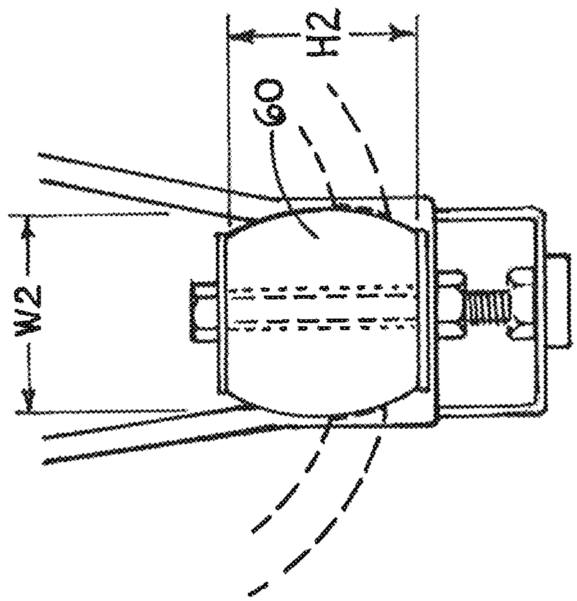
FIGS. 5A and B are plan views of the sub-assembly 24 of mounting bracket 20 of FIGS. 3A and B that is used to mount bracket 20 into opening 13 of an animal skull like that of FIG. 4.
Figure 5A:
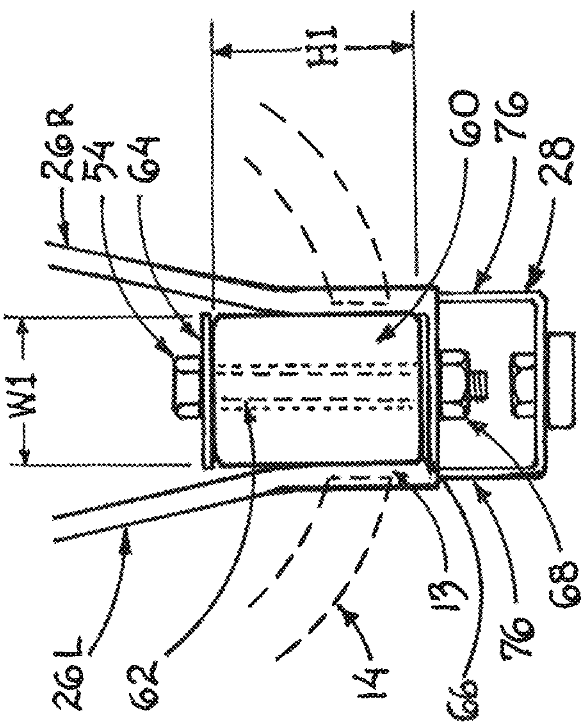

FIGS. 5A and B show a feature of expandable member 24. In one state (FIG. 5A) with bolt 52 turned in nut 68 (which is welded to bracket 22 around hole 67) to its tallest height H1 (FIG. 5A, distance between washers 64 and 66) at opposite ends of cylinder 60 (which has a through bore 62 for bolt 52) would be in a non-compressed state as shown in FIG. 5A. Its width W1 would therefore be at its smallest.

Hexagonal socket 58 counter-bored into the end 56 of bolt 52 opposite from head 54, would allow a hex wrench to turn bolt 52 in welded nut 68. If turned to move bolt 52 down through nut 68 (FIG. 5B), head 54 of bolt 52 would compress washer 64 against elastomeric cylinder 60 which would bulge elastomeric member 60. Height H2 would be less than height H1 but width W2 would be greater than width W1.

As can be appreciated, this combination would allow an elastomeric cylinder 60 selected to freely (or substantially freely) fit into most spinal openings 13 of the type of animal skull of animal skull 14 and then the hex wrench used to increase the greatest cross-sectional diameter of elastomeric cylinder 60 when in spinal opening 13 to interference fit and fix skull 14 to bracket 20. In essence, not only does elastomeric member 60 allow obtaining a tight connection between bracket 20 and animal head 12, it provides a range of widths W that could work for a number of widths of spinal opening 13.

An additional feature of bracket 20 is as follows.

As seen in most detail at FIG. 3A, pivot body 22 pivots around bolt 80 held across ears 86 by bolt head 82 and nut 84. Bolt 72 holds base 28 of bracket 20 to shed horn 30. Base 28 can be rotated and locked in different positions relative to horn 30. Nylon or plastic washers 78 could be between pivot body base 28 and horn 30.

By untightening nut 84, pivot body 22 can be swung over substantial range around a pivot axis through bolt 80. When a desired angle is determined, bolt 84 is tightened down to lock the relationship between the angle of main pivot body 22 of bracket 20 and shed horn 30.

Figure 3B:
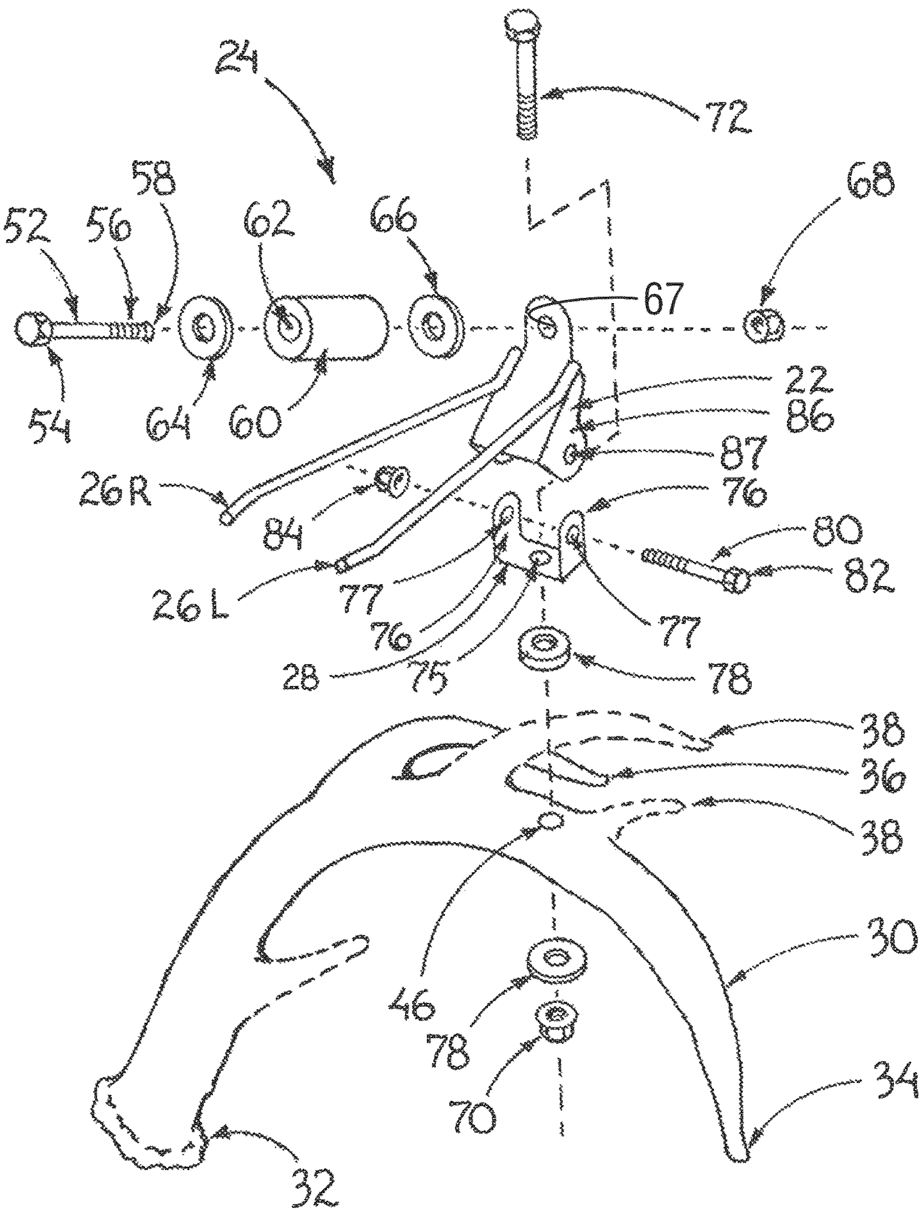
FIG. 3B is an exploded view of the bracket of FIG. 3A and the interface (the shed horn).

As shown in FIGS. 3A-B, a hole 46 can be drilled or machined at a selected position through the main part of shed horn 30. Threaded bolt 72 can be pushed through hole 75 in base 28 and hole 46 in shed horn 30. Nut 70 can secure it all in place on shed horn 30.

As can be seen in combination with the whole system 10 assembled, bracket 20 can be fixed to animal skull 14 as described above. Prongs or arms 26L and R and expandable member 24 provide a good stable connection. Bracket 20 can be mounted through hole 46 in shed horn 30 and nut 70 tightened down. As shown in FIG. 1, another through hole 44 in shed horn 30 (in this instance near distal end 32 of shed horn 30), allows a screw 42 or other fastener to fasten shed horn 30 to vertical wall. Alternatively, shed horn 30 can simply be set on a horizontal surface such as tabletop 48 (see FIGS. 2A-G).

Importantly, bracket 20 allows different pivotable adjustment of orientation of animal head 12. As shown in FIGS. 1 and 2A, if an X axis is designated through bolt 80 (the pivot axis for pivot body 22) an orthogonal Y axis along the axis of bolt 72 (the bolt that bolts bracket 20 to shed horn 30), and an orthogonal Z axis which is 90° to each of the X and Y axes, the general longitudinal axis S through skull 14 is generally parallel to axis Y when the whole assembly of mounting interface shed horn 30 and skull 14 (the whole combination for system 10) is hung from a vertical wall 40 in the orientation of FIG. 1. In contrast, as shown in FIG. 2A, pivot body 22 of bracket 20 can be adjusted such that the longitudinal axis S of skull 14 when in table-mount system configuration, could be generally parallel to axis Z. As has previously been discussed, the orientation or pivoted orientation of skull 14 to interface 30 can be adjusted over a range in between those configurations.

OPTIONS AND ALTERNATIVES

It will therefore be appreciated that the invention can take many forms and embodiments. Variations obvious to those skilled in the art will be included within the invention. The above examples are neither inclusive or exclusive of all forms the invention can take.

For example, as mentioned, different types and shapes of mounting interfaces 30, other than a shed horn or simulated shed horn, are possible. Additionally, other items to be mounted or displayed are possible.

The precise way in which pivotal motion or adjustment of brackets 20 or fixing bracket 20 to the animal head or other item to be mounted or displayed are possible.

As another example, if a bracket like 20 is used for larger or smaller animal heads, it can be scaled up or down according to need or desire. Also, the length, shape, or even number of prongs 26 could be varied according to need or desire.

What is claimed is:

1. A system for mounting or displaying a non-human animal head comprising:

a. a non-human animal head comprising a skull with or without horns, the skull having at least one opening;

b. a surface mounting interface comprising an actual or simulated part of a non-human animal and having characteristics allowing it to be a stable mounting configuration either along a wall or sitting on a horizontal surface;

c. a non-human head mounting interface comprising an extension that fits within the at least one opening of the skull along an axis, said extension having a sub assembly that comprises an elastomeric member having a greatest cross-sectional diameter wherein said elastomeric member is adjustably radially expandable relative to the axis of the extension to increase its greatest cross-sectional diameter for adjustable interference fit over a range of radial widths in the at least one opening; and d. an adjustable member between the surface mounting interface and the non-human head mounting interface allowing angular adjustment of the skull relative to the actual or simulated part of the non-human animal for either wall or horizontal surface display.

2. The system of claim 1 further comprising a second extension from the non-human head mounting interface adapted to be inserted in or otherwise stabilize the non-human animal head relative to the non-human head mounting interface.

3. The system of claim 1 further comprising means for mounting, securing, or attaching the surface mounting interface to a vertical surface.

4. The system of claim 1 wherein the non-human animal head comprises a horned non-human animal head and the actual or simulated part of the animal of the surface mounting interface comprises a shed horn.

5. The system of claim 4 wherein the shed horn comprises at least three locations positioned in a plane to function as a tripod.

6. The system of claim 5 wherein the three locations include a proximal and a distal end on the shed horn, and an intermediate extension between the proximal and distal ends.

7. The system of claim 1 wherein the non-human head mounting interface comprises a bracket mounted to the part of the non-human animal, the bracket including one or more extended members that would extend into the at least one opening of the skull.

8. The system of claim 7 wherein the bracket has an adjustability for at least one of the one or more extended members relative to the actual or simulated part of the non-human animal to allow adjustment of the non-human animal head relative to the actual or simulated part of the non-human animal.

9. An adjustable apparatus for displaying a non-human animal skull, including mounting to a vertical surface or supporting it on a horizontal surface comprising:

a. a mounting interface comprising an actual or simulated shed horn;

b. a bracket connected to the mounting interface;

c. the bracket including: i. an extension having a longitudinal axis and a sub assembly comprising a selectively radially expandable cross-sectional diameter elastomeric member adjustable between an uncompressed state and a plurality of compressed states along the longitudinal axis; ii. mechanism adapted to fix the non-human animal skull to be displayed to the bracket by adjusting the elastomeric member between the uncompressed state and one of the plurality of compressed states and iii. an adjustment member for selectively adjusting an angular relationship between the bracket and mounting interface depending on presented orientation of the non-human animal skull to be displayed.

10. The system of claim 9 wherein the selectively radially expandable cross-sectional diameter elastomeric member can be inserted into the non-human animal skull to be displayed and expanded to create an interference fit.

11. The system of claim 9 wherein the shed horn can be attached along the vertical surface and has features effectively functioning as a tripod for stable support on a horizontal surface.

12. The system of claim 9 wherein the simulated shed horn has an aesthetic appearance of an actual shed horn.

13. A method for displaying a non-human animal trophy comprising:

a. providing an actual or simulated shed horn;

b. mounting the non-human animal trophy to the actual or simulated shed horn by an interference fit between an extension and the non-human animal trophy, said extension having a longitudinal axis and a subassembly, said subassembly comprising radially expandable elastomeric member having a cross-sectional diameter which is adjustably swellable or enlargeable along the longitudinal axis by an adjustment mechanism; wherein said interference fit is configured to deter separation of the non-human animal trophy and the radially expandable elastomeric member regardless of a relative orientation between the non-human animal trophy and the radially expandable elastomeric member; and c. either mounting the combination of non-human animal trophy and shed horn to a non-horizontal surface or supporting the combination on a non-vertical surface.

14. The method of claim 13 wherein the actual or simulated shed horn comprises at least three locations that function as a tripod.

15. The method of claim 13 wherein the orientation of the non-human animal trophy relative to the actual or simulated shed horn can be adjusted.

16. A system for mounting or displaying a non-human animal head comprising:

a. a non-human animal head comprising a skull with or without horns, the skull having at least one opening;

b. a surface mounting interface having characteristics allowing it to be a stable mounting configuration along or on a surface; and c. a non-human head mounting interface comprising an extension that fits within the at least one opening of the skull along an axis, said extension having a sub assembly that comprises an elastomeric member having a greatest cross-sectional diameter wherein said elastomeric member is adjustably radially expandable relative to the axis of the extension to increase its greatest cross-sectional diameter for adjustable interference fit over a range of radial widths in the at least one opening.

17. The system of claim 16 further comprising a second extension from the non-human head mounting interface adapted to be inserted in or otherwise stabilize the non-human animal head relative to the mounting interface.

18. The system of claim 16 further comprising means for mounting, securing, or attaching the surface mounting interface to a vertical surface.

19. The system of claim 16 wherein the non-human animal head comprises a horned non-human animal head and the surface mounting interface comprises an actual or simulated shed horn.

20. The system of claim 19 wherein the shed horn comprises at least three locations positioned in a plane to function as a tripod.

21. The system of claim 16 wherein the non-human head mounting interface comprises a bracket including one or more extended members that would extend into the at least one opening of the skull.

22. The system of claim 21 wherein the bracket has an adjustability for at least one of the one or more extended members relative to the surface mounting interface, wherein the surface mounting interface comprises an actual or simulated part of a non-human animal, to allow adjustment of the non-human animal head relative to the actual or simulated part of the non-human animal.

* * * * *